United States Patent [19]

Rein-Weston

[11] 4,319,219
[45] Mar. 9, 1982

[54] AUTOMATIC APPROACH LANDING AND GO-AROUND CONTROL SYSTEM FOR AIRCRAFT

[75] Inventor: Karl J. Rein-Weston, Seattle, Wash.

[73] Assignee: The Boeing Company, Seattle, Wash.

[21] Appl. No.: 164,438

[22] Filed: Jun. 30, 1980

[51] Int. Cl.³ .................. G01C 21/00; G01C 5/00; G08G 5/00

[52] U.S. Cl. .................. 340/27 SS; 73/178 T; 244/188

[58] Field of Search ............ 340/27 SS, 27 R, 27 NA; 73/178 T, 179, 178 R; 244/182, 183, 185, 186, 188, 191; 364/428, 430, 433

[56] References Cited

U.S. PATENT DOCUMENTS

| | | | |
|---|---|---|---|
| 3,496,769 | 2/1970 | Vietor | 73/178 R |
| 3,667,293 | 6/1972 | Moore | 73/178 R |
| 3,789,661 | 2/1974 | Melsheimer | 73/179 |
| 4,021,010 | 5/1977 | Bliss | 73/178 T |
| 4,079,905 | 3/1978 | Greene | 340/27 SS |

Primary Examiner—Thomas A. Robinson
Attorney, Agent, or Firm—Conrad O. Gardner; B. A. Donahue

[57] ABSTRACT

A system for providing an aircraft pilot and/or autothrottle and go-around pitch axis control with information when a go-around should be initiated during an approach in response to either a hazardous flight status of the aircraft or to wind shear encounter by the aircraft. The present system utilizes a gain schedule control law based on the bug speed set by the pilot and on pilot go-around criteria to trigger a go-around signal for the pilot and/or the automatic control systems.

5 Claims, 10 Drawing Figures

AUTOMATIC APPROACH LANDING AND GO-AROUND CONTROL SYSTEM FOR AIRCRAFT

This invention relates to manual control or automatic control of an aircraft during approach landing and go-around phases of a flight and more particularly to wind shear detector systems.

No successful attempts have been made in the prior art to provide a system for automatically informing the pilot and/or automatic control systems of the precise time when a go-around should be initiated during wind shear encounters. Prior attempts to provide wind shear detection systems have failed to give the pilot a direct "feel" of how effective his controls are, i.e. throttles and elevator, in overcoming the effects of wind shear encounter. A failure of the prior systems to provide this "feel" to the pilot lies in the fact that longitudinal accelerometer output signals are utilized. Such inertial signals cannot be utilized per se to relate the aircraft's acceleration or deceleration resulting from corrective control to the air-mass movement in which the aircraft is flying.

In a first prior art system, $\dot{E}$ signal is based on inertial accelerometer signals. In contrast the present system embodiment computes $\dot{E}$ using air data signals only. As a consequence the aforementioned prior art system cannot satisfactorily be linked to drive the autothrottle system of the aircraft whereas the present system is specifically intended to provide such coupling to the autothrottle system of the aircraft. While the aforementioned prior art system, as also the present system, is designed to indicate wind shear effects, the prior art system displays essentially what the airmass is doing with respect to the inertially referenced aircraft. Such a system of course negates the effectiveness of providing the pilot with an understanding of what the aircraft is doing with respect to the airmass in which he is flying the aircraft. In contrast, the present system can aid control of the aircraft under fully automatic control while also displaying what the aircraft is doing with respect to the airmass in which it is flying. The aforementioned prior art system utilizes an angle of attack signal for modulation of a wind shear warning. In further contrast, the present system employs a gain schedule control law based on the "bug" speed set by the pilot and on pilot go-around criteria to trigger a go-around signal for the pilot and/or the automatic control systems of the aircraft.

Turning now to exemplary prior art patent literature, it is observed in the U.S. Pat. No. 3,496,769 that the geometric position of the aircraft on approach relative to the airport via measurements of altitude and DME is calculated. Such a system can be utilized to fly the aircraft back to the glide slope (if displaced from it) in a smooth and predicted way.

U.S. Pat. No. 3,667,293 provides a way of obtaining specific total energy rate of an aircraft from which the pilot is able to trade potential energy for kinetic energy and vice versa.

In contrast to the aforementioned prior art system and prior art patent literature, important features, aspects and objects of the present invention include the following:

It is an object of the present invention to provide in an automatic approach landing and go-around control system, a wind shear detector circuit and go-around trigger which utilizes velocity and altitude rate signals available from an onboard air data computer.

It is a further object of the present invention to provide automatic go-around control initiation in response to wind shear detection circuitry in which sensors such as angle of attack sensors, pitch attitude sensors, bank angle sensors, and vertical and horizontal accelerometers are not utilized.

It is yet another object of the present invention to provide fully automatic throttle response to wind shear and vertical wind effects on the aircraft.

It is still another object of the present invention to maintain good positioning of the aircraft in terms of velocity and altitude rate on approaches for initiation of a go-around maneuver if required.

It is yet another object of the present invention to provide automatic go-around trigger signals thereby alleviating pilot decision making of when a go-around should be accomplished, which trigger signal is dependent upon radio altitude thereby allowing safe altitude for go-around.

It is still another object of the present invention to provide visual display means for pilot and crew observation of the effects of wind shear on the aircraft and also effects of the present control system application to aircraft control.

It is yet a further object of the present invention to provide automatic go-around triggering which is activated when the adverse effects of a wind shear being encountered are more severe than the allowable wind shear severity for that particular radio altitude of the aircraft.

The following description of the derivation for energy rate is believed helpful in understanding the concept embodied in the preferred embodiment of the present system: aircraft energy is given as the sum of potential and kinetic energies.

$$\text{Total energy, } E_p + E_k = mgh + \tfrac{1}{2} mv^2$$
$$\text{where } m = \text{aircraft mass}$$
$$h = \text{altitude}$$
$$v = \text{airspeed}$$
$$g = \text{gravitational constant}$$

A simpler measure is energy height or specific total energy; E, given by $$E = \frac{E_p + E_k}{mg} = h + \frac{v^2}{2g}$$

Differentiating with respect to time gives the aircraft's specific energy rate as $$\dot{E} = \dot{h} + \frac{v\dot{v}}{g}$$

Therefore, energy rate is the sum of rate of climb/descent and an airspeed rate term.

Relating energy rate to flight operations procedures, the practice of normally flying speed-stabilized initial climbs, approaches and landing means that under most conditions the $\dot{v}$ term is zero. This implies, therefore, that if there is no airspeed rate of change, the energy rate is equal to the rate of climb/descent. Anticipated exceptions to this are pilot-induced as a change in thrust or configuration, causing an expected airspeed change.

Any other exception is due to atmospheric movement, such as wind shear.

In accordance with the preceding objects, features and theory of operation, a preferred embodiment of the invention includes circuit means for providing an aircraft total energy rate signal which is coupled to electrically drive a second needle on a modified electric two-needle instantaneous vertical speed indicator with the rate of climb/descent being displayed on the outer pointer while the energy rate is displayed on the concentric inner pointer. The go-around automatic control system informs the pilot by display means and/or initiates automatic control systems when a go-around should be initiated during wind shear encounters. In such wind shear encounters the pilot is provided with a direct feel of the effectiveness of throttles and elevators in overcoming the wind shear effects.

The aforementioned and other objects and advantages of the invention, as well as the details of an illustrative embodiment demonstrative of specific control law electronics, will be more fully understood from the following description and drawings, in which.

Figure 7:
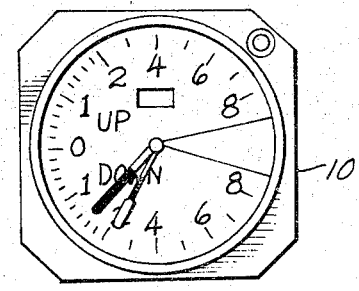
FIG. 7 shows the display readout during wind shear encounter under downdraft effects.
Figure 8:
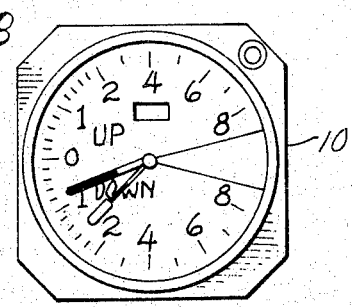
FIG. 8 shows the present system display during wind shear encounter under circumstances of loss of headwind.
Figure 9:
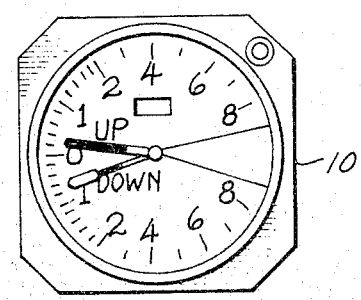
Figure 10:
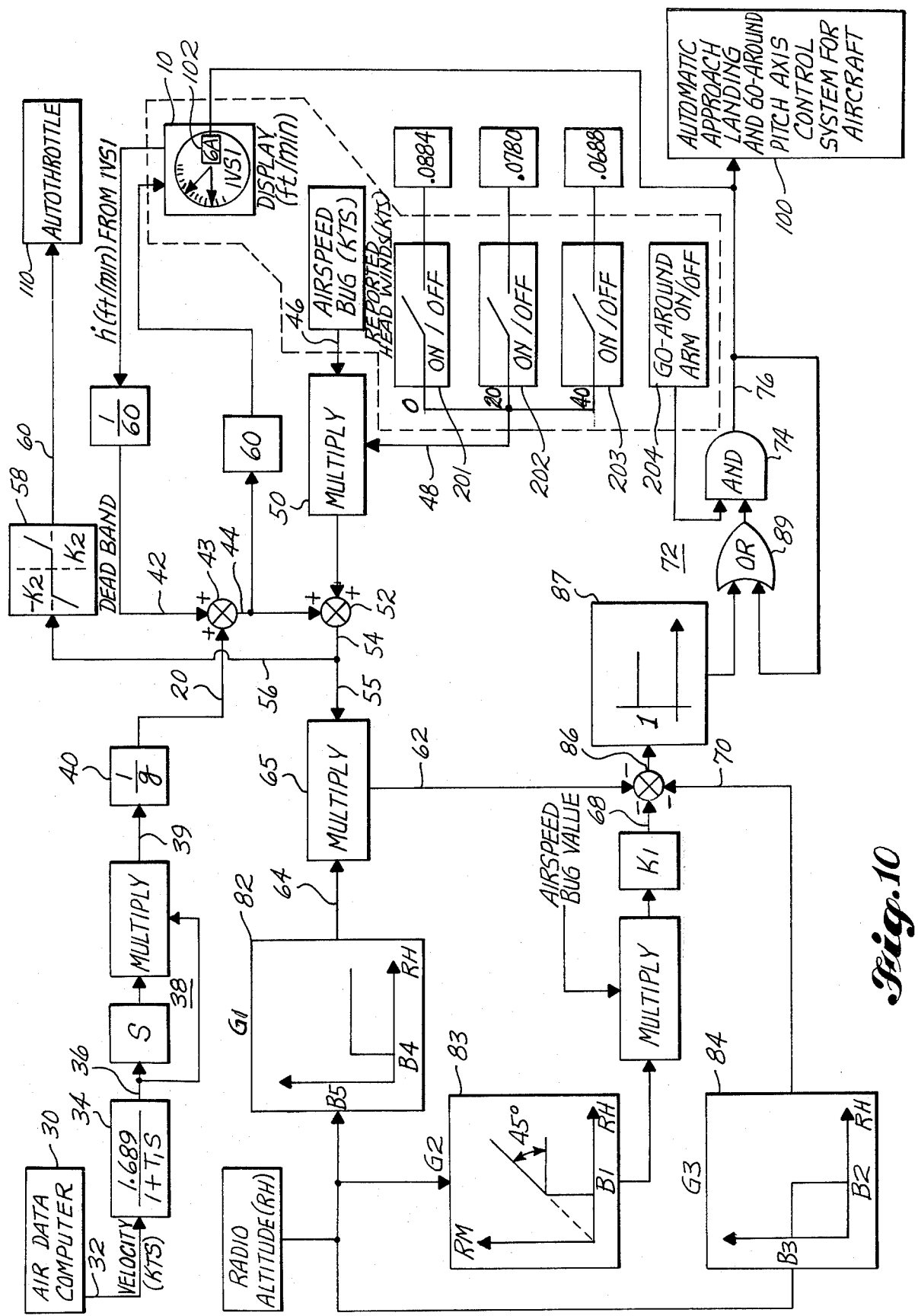

FIG. 9 shows the system output display during the wind shear encounter at time of a recovery maneuver; and, FIG. 10 is a block diagram employing the present control law suitable for driving the display instruments under the conditions shown and described in connection with FIGS. 1 through 9 and/or automatically providing a corrective control signal during wind shear encounter for use by the aircraft's autothrottle and go-around systems.

Figure 1:
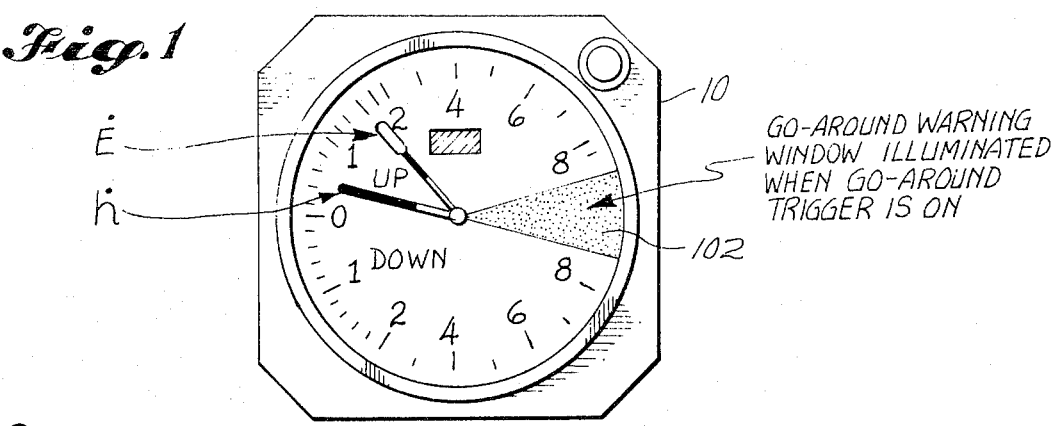
FIG. 1 is a front view of a two-needle display embodiment for display of pilot information in the present wind shear detector and go-around system.

Turning now to the instruments displaying the information indicated by the legends in FIG. 1, it will be noted that the instrument includes a first indicator needle arranged in a conventional manner as an electric instantaneous vertical speed indicator (IVSI). The energy rate signal $\dot{E}$ generated in the system of FIG. 10 hereinafter described is coupled to electrically drive a second instrument needle as shown in the instrument 10 of FIG. 1. It can be seen then that the instrument of FIG. 10 has first and second instrument needles for displaying simultaneously the energy rate signal and the rate of climb/descent representative signal. The instrument of FIG. 10 could instead display energy rate on the concentric inner instrument needle pointer to the same conventional scale in feet/minute as vertical speed shown in the display portion of the instrument 10 of FIG. 1.

Different conditions encountered by an aircraft utilizing the system of FIG. 10 on approach will be displayed on the instrument 10 of FIG. 1, and the various conditions are shown in the displays of FIGS. 2 through 9. Prior to a discussion of the conditions displayed on the instrument in FIGS. 2 through 9 it should be noted that the advantages of the type of display provided by the instrument of FIG. 10 include the following:

1. Prompt alert of wind shear and either horizontal or vertical direction is displayed.
2. Since the display is in normal use it is therefore frequently monitored.
3. The simplicity of the two-needle indicator upon a familiar background representation leads to easy recognition of the data.
4. The IVSI is included in the natural pilot scan with a familiar warning level
5. There is a continuous display of trend formation.
6. There is no requirement of an extra instrument, only the modification of an IVSI to a two-indicator needle instrument.
7. The instrument 10 is useful for take-off acceleration monitoring, speed stabilization during climb, and for monitoring continuous descent and potential "hurried" approaches.

The display instrument 10 is utilized in the hereafter described manner.

During the approach, a speed-stabilized continuous descent is flown to become fully established on the ILS before the outer marker, the energy rate needle being ideally covered by the rate of climb needle. A potential "hurried approach" is warned by the energy rate being less than the rate of descent. As the gear is commanded to the "down" position, airspeed is lost, and the energy rate needle will fall below the rate of descent needle, as anticipated by the pilot. The display 10 would confirm the results of the configuration change and would indicate the corrective action required. The pilot either applies thrust to counter the increased drag, or lowers the nose and accepts an increased rate of descent. Either way, a speed-stabilized approach is achieved by covering the energy rate needle with the rate of climb needle.

In wind shear, the changing horizontal and/or vertical situation is indicated by the unexpected swing apart of the two needles. The corrective action is similar to that described above. The need to take that action is demonstrated (for final approach, say) by either needle passing the $-1000$ ft/min mark—as per normal operations procedures.

Figure 2:
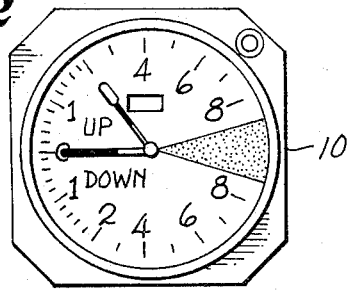
FIG. 2 shows the display of FIG. 1 with no wind shear encounter by the present system and is showing at time of take-off.

In an aircraft embodiment of the system of FIG. 10, and under normal operating procedures of the aircraft with no wind shear encounter the system of FIG. 10 will provide the displays on instrument 10 as shown in FIGS. 2, 3, 4, 5, and 6. With wind shear encounter an aircraft including the system of FIG. 10 will provide the output displays on the instrument 10 as shown in FIGS. 7, 8, and 9. With no wind shear, the display of FIG. 2 is illustrative of take-off condition of the aircraft where the energy rate shows a high rate of climb and provides a rough check on take-off acceleration while vertical speed is zero as indicated in FIG. 2.

Figure 3:
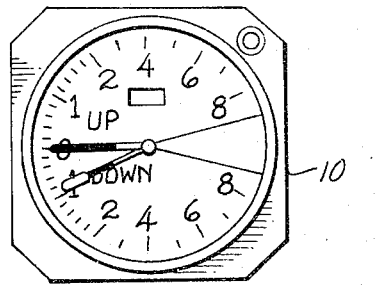
FIG. 3 is a display with no wind shear encounter at the time of intercept of the glide path.

FIG. 3, with the aircraft is a no wind shear situation, shows that intercepting the glide path requires reduction in power until the energy rate needle shows the expected rate of descent for the approach. In this manner an observance under these conditions of the instrument 10 in FIG. 3 enables set up of the aircraft by the pilot rapidly without trial and error.

Figure 4:
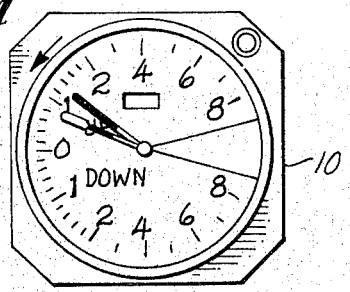
FIG. 4 shows the display with no wind shear encounter under circumstances of aircraft climb with noise abatement procedure.

FIG. 4 is illustrative of climb with noise abatement which involves reducing vertical speed to the same value as energy rate, which will result in a constant speed climb out.

Figure 5:
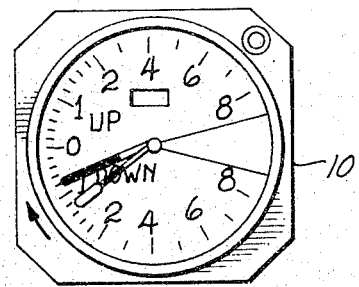
FIG. 5 is a display under circumstances of no wind shear encounter by the system while establishing the glide path.

In FIG. 5 while flying the glide path, and after all configuration changes and speed stabilization maneuvers have been completed, the energy rate needle can be aligned with the desired descent rate by either manually making small throttle and/or elevator corrections as required, or by allowing the automatic systems to perform that task in the manner hereinafter described in the system shown in FIG. 10.

Figure 6:
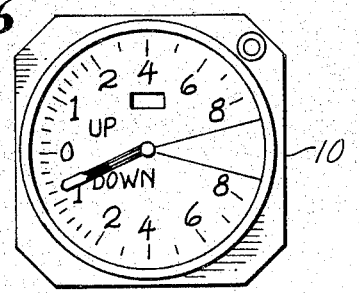
FIG. 6 is a display at time of no wind shear encounter under circumstances of stabilized approach.

In FIG. 6 it can be seen that a stabilized approach, with energy rate needle overlayed by vertical speed needle, will produce no acceleration relative to flight path, i.e. constant airspeed will be maintained.

Now turning to the display representations in FIGS. 7, 8, and 9, which show the effects of wind shear, it can be seen that a downdraft as seen in FIG. 7 affects both needles, which show high rate of descent, though actual positions may be reversed, depending on wind profile. In FIG. 8, loss of headwind causes the energy rate needle to indicate a high rate of descent before the vertical speed does, i.e. decreasing headwind or increasing tailwind. In FIG. 9 a recovery maneuver causes the flight path to be upwards as shown by the vertical speed needle, but energy rate might remain less as shown in FIG. 9. This implies that more power is required to climb at a steady speed or drag must be reduced (flaps retracted by one or two stages). Alternatively, if the pilot considers he is still in a position to land, instrument 10 of FIG. 9 shows he could make a steady speed approach at −700 feet/minute.

Turning now to FIG. 10, there is shown a block and schematic diagram illustrative of the present control law utilized for flight through wind shear encounters on approach. The output of the system of FIG. 10 may be coupled to output display 10 for enabling the pilot to manually make small throttle and/or elevator corrections as required or the system of FIG. 10 may be allowed to automatically perform the task through output of the automatic systems including autothrottle 110 and automatic approach landing and go-around pitch axis control system 100. The signal 44 representative of specific energy rate ($\dot{E}$) is obtained as follows: first, the signal 42 representative of vertical speed ($\dot{h}$) is obtained from the electrical output of an IVSI instrument (which has been modified to display a second pointer to be driven by the signal 44 representative of $\dot{E}$ value in feet/per minute). A signal representative of $v\dot{v}/g$ is obtained by utilizing the signal 32 representative of aircraft airspeed (v) from onboard air data computer 30. The value of signal 32 representative of v is changed from knots into feet/second through gain and low path filter circuit 34 which minimizes the effects of turbulence. The signal 36 representative of the lagged value of v is then multiplied downstream by its differential with respect to time in circuit means 38. Output signal 39 from circuit means 38 is then processed through gravity divider circuit 40 to obtain the signal 20 representative of $v\dot{v}/g$. Summing circuit 43 sums the signal 42 representative of vertical speed ($\dot{h}$) and the signal 20 representative of $v\dot{v}/g$ to provide the output signal 44 representative of $\dot{E}$ in feet/second. The signal 44 representative of $\dot{E}$ which signal is normally a negative quantity on an approach, is then summed in summing circuit 52 with the product of pilot-selected airspeed bug value 46 and a signal 48 representative of reported headwind. Summing of the signal 44 with the product in multiplier means 50 of the signals 46 and 48 in summer circuit 52 provides the signal 54 representative of the desired rate of descent minus the specific energy rate ($\dot{E}$) of the aircraft. The signal 54 is further utilized downstream in two further signal paths viz., the signal 54 is coupled in a first path 56 through dead band circuit 58 to provide signal 60 utilized as the input to the autothrottle 110 speed mode. The utilization of series circuit element 58 eliminates unnecessary throttle movement due to minor fluctuations in the signal representative of $\dot{E}$. Signal 54 is utilized in further path 55 where it is multiplied in multiplier circuit 65 with a signal 64 representative of radio altitude to provide the signal 62. The function provided by circuit 82 inhibits signal 62 when the aircraft is very close to touchdown which then also inhibits the go-around trigger. Signal 60 hereinbefore discussed is utilized for operation of autothrottle 110 to advance or retard the throttles promptly according to the effects on the aircraft of wind shear being encountered (both vertical and/or horizontal shears). The signal 62 is compared to a reference allowable signal 68 which transfers smoothly to signal 70 at throttle retard in the flare maneuver. This transition is required to counter the normal change in $\dot{E}$ due to throttle retard and is accomplished by the gain functions G2 and G3 in circuits 83 and 84.

The resultant difference between signals 62 and 68 (or signal 70) is then coupled to logic circuit 72 comprising a "high" or "low" function circuit 87, OR gate 89 and AND gate 74 which is latched. AND gate 74 provides go-around trigger signal 76 utilized in automatic approach landing and go-around pitch axis control system 100 and also to illuminate go-around warning window 102 on display instrument 10.

In addition to display instrument 10 on the pilot's display panel, four push-button energized lamps which illuminate when in the "ON" condition are also included. The first three of these push-button energized lamps viz. push-button energized lamps 201, 202, and 203 are utilized for selecting the nearest headwind component (correspondingly either 0, 20, or 40 KTS) reported by the tower. Fourth push-button lamp 204 also incorporated on the pilot's display panel is utilized to arm the go-around trigger.

The pilot task in utilization of the system embodiment of FIG. 10 on every approach and landing is merely to depress go-around arm push button 204, depress the nearest component of headwind selection switches 201, 202, or 203 and otherwise carry out the normal aircraft operational procedure of selecting the desired airspeed bug value. The aforementioned minimal pilot task in utilization of the aforementioned described system will be appreciated by those skilled in the art.

Numerical cconstants utilized in the system of FIG. 10 for application of the system of FIG. 10 for utilization on a Boeing Aircraft Company type 747 aircraft are:

g = 32 ft/sec
$K_1$ = 0.00125 1/sec. kts.
$K_2$ = 10 ft/sec
$T_1$ = 2 sec.
$B_1$ = 32 ft.
$B_2$ = 37 ft.
$B_3$ = 10 ft/sec
$B_4$ = 5 ft.

$B_5 = 1$

I claim:

1. In combination in an aircraft:
   means for providing a signal representative of instantaneous vertical speed;
   means for providing an air data derived signal representative of airspeed;
   means responsive to said signal representative of instantaneous vertical speed and said air data derived signal representative of airspeed for providing a signal representative of energy rate; and
   display means responsive to said signal representative of instantaneous vertical speed and said signal representative of energy rate for simultaneously displaying vertical speed and energy rate.

2. In combination in an aircraft having an automatic approach landing and go-around control system;
   means for providing a first signal representative of airspeed, said first signal representative of airspeed derived from air data information;
   means for providing a second signal representative of altitude;
   means for providing a third signal representative of instantaneous vertical speed; and
   circuit means responsive to said first, second, and third signals for providing a go-around trigger to initiate a go-around maneuver of said automatic approach landing and go-around control system.

3. In combination in an aircraft pilot instrument panel:
   a two-pointer display instrument for simultaneously displaying instantaneous vertical speed and energy rate;
   a plurality of push-button operated switching means which illuminate in the ON condition, each of said plurality of push-button operated switching means associated with a respective predetermined headwind component reading in knots; and
   a further push-button operated switching means which illuminates in the ON condition, said further push-button operated switching means coupled to associated circuitry for enabling arming of a go-around trigger.

4. In combination in an aircraft having a pitch axis control system responsive to go-around trigger control signals:
   means for generating a first signal representative of specific energy rate of the aircraft;
   means for generating a second signal representative of desired rate of descent of the aircraft;
   means for subtracting said first signal from said second signal thereby generating a third signal;
   an autothrottle control system;
   means for coupling said third signal to said autothrottle control system for advancing or retarding the throttles in response to wind shear encountered by the aircraft; and
   multiplier circuit means responsive to a signal representative of radio altitude and said third control signal for providing a fourth control signal;
   circuit means coupled between said multiplier circuit means and said pitch axis control system for processing said fourth control signal and providing said go-around trigger control signals.

5. The invention according to claim 4 further including go-around warning indicator means responsive to said go-around trigger control signals.

* * * * *